March 25, 1941. T. P. PETERSEN 2,236,199
FRUIT PICKER'S BAG
Filed May 19, 1939
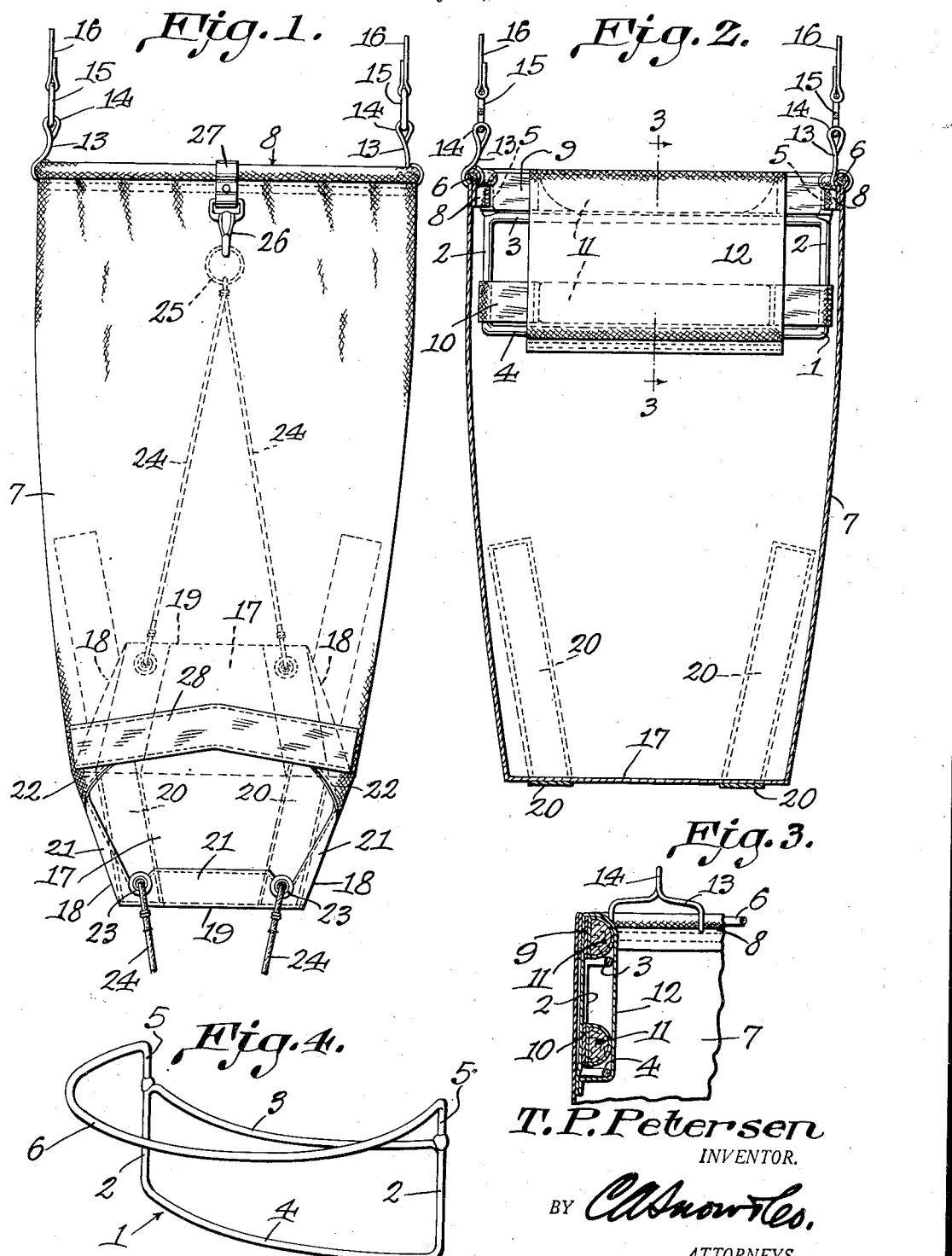
T. P. Petersen
INVENTOR.
BY C. A. Snow & Co.
ATTORNEYS.

Patented Mar. 25, 1941

2,236,199

UNITED STATES PATENT OFFICE 2,236,199

FRUIT PICKER'S BAG

Thomas P. Petersen, Lake Wales, Fla.

Application May 19, 1939, Serial No. 274,657

2 Claims. (Cl. 150—2)

This invention relates to bags designed primarily for use by persons engaged in picking citrus and other fruits.

It is the usual practice to suspend bags by means of straps or the like extending over the shoulder of the user so that the upper or open end of the bag is located where the fruit can be readily dropped into the bag. In order to facilitate placing the fruit in the bag, various means have been provided for holding the upper end stretched open. Means thus far employed, however, have been objectionable for various reasons. Some of them, while holding the bag open, do not support the upper open end so that it will extend outwardly from the body of the wearer at the proper angle. Others utilize reenforcing or stiffening means which are so located as to bruise the fruit as it is dropped into the bag. Other objectionable features are the discomforts experienced by the user due to the pressure of the reenforcing means against the body.

Another disadvantage present in fruit picker's bags, has been the difficulty experienced in preventing the collected fruit from falling out of the bag if a bottom outlet is employed and the means used for fastening the bottom in closed position and for releasing it has not always been readily accessible while the bag has been in use.

An object of the present invention is to provide a simple and efficient bag which avoids the foregoing objections, there being a reenforcing and bracing frame of novel construction housed within the open end portion of the bag whereby said end is kept open and extended outwardly at the proper angle while at the same time inward pressure from the bag against the body of the wearer is distributed so as to reduce discomfort.

A further object is to combine with the frame a novel arrangement of cushioning elements whereby the fruit is prevented from being injured by the frame as would occur should the fruit be dropped against unyielding surfaces and thus bruised.

A further object is to provide the bag with a bottom outlet having a closure flap the side portions of which are so shaped as to prevent the fruit from escaping from the corner portions of the closed bottom.

Another object is to provide a flap having means located at all times within convenient reach of the user of the bag whereby the closure at the bottom of the bag is held shut, said means being readily releasable for the purpose of opening the bag at the bottom and releasing its contents.

Another object is to provide a bag the closure flap of which, when opened, forms, in effect, a delivery spout whereby the fruit being released can be directed into a box or other container provided therefor, the discharge of the fruit being maintained under constant control so that bruising of the fruit while being delivered can be avoided.

Another object is to provide a bag suitably reenforced where needed so that its term of use will thus be prolonged.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a front elevation of the bag, the bottom being shown open and part of its supporting strap being removed, the position of the bottom closure when raised and secured being indicated by broken lines.

Figure 2 is a vertical transverse section through the bag with the bottom closed and looking toward the back.

Figure 3 is a section on line 3—3, Figure 2, taken through the back portion of the bag.

Figure 4 is a perspective view of the frame of the bag.

Referring to the figures by characters of reference, 1 designates a substantially rectangular frame formed of a metal rod bent to provide substantially parallel sides 2 and bowed top and bottom portions 3 and 4. To the upper corners of this frame are joined fingers 5 extending downwardly from the ends of an arcuate rod 6 disposed in a plane substantially at right angles to the plane occupied by the ends 2 of frame 1.

The body portion of the bag is formed of a heavy fabric, such as canvas and has been indicated at 7. This body portion is preferably tapered toward the bottom while the upper end of the body portion is folded inwardly and stitched so as to house the arcuate rod 6, as shown at 8. That part of the inturned or folded portion at the back of the upper end of the body and between the fingers 5 forms a reenforcing hem which extends from one side to the other of the bag.

A web 9 of heavy fabric, such as canvas, is secured at its ends to the fingers 5 and is stretched taut above the top portion 3 of the frame 1. Another similar web 10 is secured at its ends to the sides 2 of frame 1 and is drawn taut above and adjacent to the lower member 4 of the frame 1.

To each of these webs is secured an elongated pad 11 of suitable cushioning material and these pads project inwardly within the bag so as to constitute shields or guards for preventing falling fruit from being bruised or otherwise injured by those portions of the frame extending transversely of the bag.

A deflecting casing 12 formed of a heavy fabric, such as canvas, is extended over the web 9 and the pad thereon and downwardly at the front and back of the two pads, this casing being secured around frame 1 and bridging the space between the pads. The deflector 12 is extended throughout the greater portion of the width of the bag as shown particularly in Figure 2.

The upper and lower portions of the casing or deflector 12 are fastened to the adjacent portions of the body 7 of the bag by stitching or riveting or any other suitable means. Consequently the parts of the bag are held securely assembled with the frame 1 and the pads and the upper open end of the bag is maintained at all times substantially at right angles to the sides 2 of frame 1.

Yokes 13 can be fastened at their ends to the rod 6 by bending said ends around the rod and each of these yokes can be formed with an intermediate eye 14 for engagement by buckles 15 or the like used for joining the ends of a shoulder strap 16 to opposite side portions respectively of the bag.

As before stated the bag is open at the bottom and is tapered downwardly toward its lower end. The back portion of the bag, which is that portion to which the frame 1 is joined, has a flap 17 integral therewith and extending downwardly below the front portion. This flap has downwardly converging sides 18 terminating at the ends of the straight intermediate edge 19 of the flap. This flap, which constitutes the closure, is reenforced by means of strong fabric webs 20 stitched to the back of the bag and extending to the edge 19 of the closure flap, the said webs converging toward the end of the flap as shown particularly in Figure 1. The side and bottom edges of the closure flap are also reenforced by inturning the edge portions and stitching them as shown at 21 and the front of the bag merges, along curved lines, into the sides of the closure flap so as to form corner webs 22 which are substantially triangular and constitute closures and deflectors for the opposed side portions of the open bottom of the bag.

Eyelets 23 can be located in the flap closure 17 adjacent to the ends of its intermediate or straight edge 19 and secured in these eyelets are the ends of a cord 24 the intermediate portion of which is secured to a ring 25 or the like. This cord is so proportioned that when the closure 17 is pulled upwardly so as to lap the front of the bag and thus close the bottom of the bag, ring 25 can be placed in engagement with a snap hook 26 or the like joined to the middle portion of the arcuate bar 6 by a clip 27 or other suitable means. In Figure 1 the position of these parts when the bottom of the bag is closed have been indicated by broken lines.

In using the bag herein described the strap 16 is placed over the shoulder of the wearer as ordinarily so that the bag will be supported a little to the front of one side of the wearer with the frame 1 thrusting backwardly through the bag fabric against the user. As this frame bears against the body of the user along the upper and lower portions 3 and 4 of the frame, the frame is prevented from tilting to any objectionable extent with the result that the arcuate bar or rod 6 is maintained in a substantially horizontal position so that the upper or open end of the bag is similarly located. This result is further obtained through the use of the yokes 13 which are connected to the rod 6 at points located beyond the terminals thereof so that when a supporting strap or the like is connected to the yokes, the tendency of the structure to tilt is overcome. If ring 25 is in engagement with hook 26 the bottom flap or closure 17 will be held in raised position at which time the corner webs 22 will be folded and fruit contained in the bag will thus be prevented from leaking outwardly at the sides of the opening in the bottom. As the fruit is picked it is dropped into the bag. The pads 11 prevent the fruit from being bruised by any portion of the frame.

As the bag fills the user, without bending, disengages ring 25 from hook 26 and allows the cord 24 and the flap closure 17 to drop. As the flap swings downwardly to open position it will bend transversely and cooperate with the webs 22 to form, in effect, a spout along which the fruit will travel into the box or other receptacle provided therefor. Should the user retain his grip on the ring 25 and merely lower the ring, the flow of the fruit from the open bottom end of the bag can be controlled.

The use of the webs 22 is important because they serve to deflect the fruit as it is gravitating from the bag and also serves to positively close the opposed side portions of the bottom opening when the flap closure 17 is raised.

Obviously by constructing a bag as herein described, it can be carried with much more comfort than the ordinary bag provided for this purpose which has means for holding the upper ends open. Furthermore danger of injury to the fruit from bruising is prevented because the fruit cannot strike any hard surfaces at the inlet and can be controlled easily while flowing through the outlet.

When the fruit is dropped into the bag it will of course strike the casing or deflector 12 and as this is cushioned by the pads 11 which also serve as shields or guards for the upper and lower portions 3 and 4 of the frame 1, the fruit will be well protected at all times during the picking operation.

It is to be understood that reenforcing webs or the like can be located at any point desired for the purpose of prolonging the life of the bag. For example a protecting or reenforcing strip 28 can be secured across the front of the bag along the bottom edge thereof and extended from one web 22 to the other.

What is claimed is:

1. In a device of the class described a one piece rigid frame including an arcuate rod, fingers depending from the ends of the arcuate rod and disposed in a plane substantially at right angles to the plane occupied by the arcuate rod, a stiff bowed connection between the fingers and below the plane occupied by the arcuate rod, a taut flexible web connecting the fingers between the arcuate rod and the arcuate connection and substantially bridging said arcuate connection, said web constituting a yieldable cushioning element for transmitting thrust against the body of a user, a bag having an open end extending around the frame and secured to the arcuate rod, said bag having a substantially flat back portion extended along and outside of the web, an elongated pad within the bag and extending along the web, said pad being proportioned to overlie and extend over the stiff connection, and a flexible deflector connected to the top of the bag and overlying the pad, said deflector being extended downwardly within the bag and below the pad and stiff connection.

2. A device of the class described including a bag open at its upper and lower ends, a flap positioned to close the lower end of the bag, a frame within the upper end of the bag, said frame including a forwardly bowed arcuate rod secured to the upper edge of the bag at the front and sides thereof, fingers integral with said rod and extending downwardly from the ends thereof, said fingers being positioned in a plane substantially at right angles to the plane occupied by the arcuate rod, a rigid arcuate connection between the fingers and positioned in a plane below the plane occupied by the arcuate rod, webs connecting the fingers at points above and below said rigid connection, said webs being taut but flexible and disposed in a plane bridging the arcuate connection and spaced therefrom, said webs being joined to the back of the bag, elongated pads extending longitudinally of the webs and proportioned to extend past the arcuate connection and into the bag, and a flexible shield connected to the top portion of the bag and overlying and extending downwardly past the pads and the connection, means connected to the arcuate rod adjacent to but forwardly of the fingers for supporting the bag from the shoulder of a user, and means for holding the bottom of the bag closed, said webs constituting means for transmitting thrust from the bag to the body of the user and for preventing engagement of the rigid connection with the body of the user.

THOMAS P. PETERSEN.